United States Patent Office 2,970,160
Patented Jan. 31, 1961

2,970,160

PROCESS FOR MAKING AMPHOTERIC SURFACE ACTIVE AGENTS

Ruth A. Walker, New York, N.Y., assignor to Johnson & Johnson, a corporation of New Jersey No Drawing. Continuation of application Ser. No. 717,313, Feb. 25, 1958. This application Feb. 11, 1959, Ser. No. 792,473

10 Claims. (Cl. 260—404.5)

This invention relates to the art of making amphoteric surface active agents and, more particularly, to an improved process for making amphoteric surface active agents.

These surface active agents are of the type

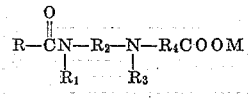

wherein

R is an aliphatic hydrocarbon radical of 9–17 carbon atoms, and preferably 11 carbon atoms;

$R_1$ is hydrogen or an aliphatic hydrocarbon or alkylol group having 2–4 carbon atoms;

$R_2$ is an alkylene radical having 2–4 carbon atoms, and preferably —$CH_2$—$CH_2$—;

$R_3$ is an alkylol radical of 2–4 carbon atoms, preferably —$CH_2$—$CH_2OH$;

$R_4$ is an aliphatic hydrocarbon having 1–4 carbon atoms, and preferably —$CH_2$—; and M is hydrogen, sodium or potassium.

These products are formed by the reaction of amines of the type

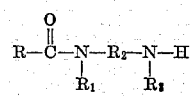

with monohalo carboxylic acids, particularly monochloroacetic acid.

Optimum conditions for making high conversion amphoteric surface active agents of the type described above have been disclosed in copending application Serial No. 639,224, filed February 11, 1957, by Allen Keough.

I have since discovered that under the proper conditions of dilution, and using an excess of chloroacetic acid and an excess of caustic, the above amines can be converted to high purity amphoteric surface active agents by adding them to a dilute aqueous solution of sodium chloroacetate that is present in at least a 30% molar excess over the amine, in the presence of water equal to at least 3 times the weight of the amine, at a temperature of 0–15° C., then gradually heating to about 95° C., and later driving the reaction to completion by the addition of a small amount of caustic, and heating further at about 95° C.

It is obvious that such conditions result in rather rapid decomposition of the chloroacetic acid present because of the high alkalinity of the reaction mixture. However, at the proper initial temperature, and using a large amount of water, together with a large excess of chloroacetic acid, the decomposition of the latter is slower in the dilute solution, and is further compensated for by its being present in a large excess. The result is a surprisingly high conversion (greater than 90%) of the amines to the corresponding amphoteric surface active agents.

It is therefore an object of this invention to provide an improved process for making amphoteric surface active agents.

It is another object to react amines of limited water solubility, having at least one hydrogen atom attached to the amino nitrogen atom, with sodium chloroacetate to form amphoteric surface active agents.

It is a further object to carry out this transformation with a minimum number of equipment controls and manipulations, thus facilitating commercial production.

The process of this invention requires that the amine be added rapidly to a cold stirred solution (0–15° C.) of at least a 30% molar excess of chloroacetic acid, previously neutralized with at least 1.3 moles of sodium hydroxide for each mole of chloroacetic acid, and where the amount of water present is equal to at least 3 times, and preferably 4–8 times, the weight of the amine. The mixture is gradually heated to about 95° C. (e.g., over a period of about 3 hours), whereupon an additional quantity of sodium hydroxide is added, amounting to at least 0.4 mole for each mole of chloroacetic acid, and the reaction is driven to completion by heating at about 95° C. for an additional 1–5 hours.

Furthermore, the above-described amphoteric surface active agents can be conveniently isolated as their barium salts.

The preferred limits of dilution and excess reagents are especially well illustrated in the following examples, which are set forth by way of illustration and not as a limitation. Parts are by weight unless indicated otherwise.

*Example 1*

In a suitable stainless steel reactor, fully jacketed and fitted with a turbine type agitator, there is charged 15,000 parts (by volume) of water, 7,000 parts of cracked ice, and 3,081 parts (32 moles) of chloroacetic acid. The mixture is cooled with stirring to 0–5° C., and 3,670 parts (45.9 moles) of 50% sodium hydroxide solution is added over a 7–10 minute period, so that the temperature of the reaction mixture is not allowed to rise above 10° C. To this mixture there is added 5,360 parts (20 moles) of the molten fatty amine condensate derived from the reaction of lauric acid with 2-hydroxyethyl ethylenediamine until 1¾ moles of volatile distillate (mainly water) are removed. The temperature is maintained at a maximum of 15° C. during the addition. The reaction mixture is then heated to 70° C. over a 30 minute period and maintained at this temperature for another 30 minutes. Then the mixture is heated to 95° C. over a 2 hour period and 1,025 parts (12.8 moles) of 50% sodium hydroxide is added over a 5 minute period. Finally, the reaction mixture is heated at 95° C. for 5 hours.

The final product is an amber-colored solution that foams readily and has a pH of about 8.45. It consists of an almost complete conversion of the fatty amine condensate to amphoteric surface active agent, having the following structure

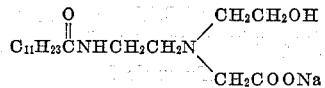

The degree of conversion is conveniently determined as follows:

A 35.17 part sample of the above amber-colored reaction product, containing theoretically 0.02 mole of active ingredient based on the weight of starting fatty amine condensate (determined by potentiometric titration), is dissolved in 35–40 parts by volume of methanol and made distinctly acid with 5 parts by volume of concentrated hydrochloric acid. The resulting solution is agitated vigorously to remove dissolved carbon dioxide, and 4.5 parts (0.0185 mole) of barium chloride dihydrate, dissolved in 10–20 parts by volume of water, is added. Then 5 parts by volume of 50% sodium hydroxide solution is added dropwise with agitation. Finally, the sample is agitated overnight in a mechanical shaker. The white crystalline solid which separates is filtered with suction and dried. The barium salt thus obtained weighs 7.61 parts. The filtrate is extracted with one 50 part by volume and two 20 part by volume portions of chloroform. The chloroform is evaporated from the combined extracts, and the residual solid obtained consists of an additional 0.20 part of the barium salt, making a total of 7.81 parts (94.8%) of barium di-N-lauroyl-N'-carboxymethyl-N'-(2-hydroxyethyl) ethylenediamine.

The amphoteric compound, substantially free of barium, can be obtained by treatment of the barium salt with an equimolecular amount of sulfuric acid, followed by removal of the insoluble barium sulfate by filtration.

Example II

Example I is repeated, except for the substitution of the following quantities for the corresponding amounts given in Example I:

| Component | Amount |
| --- | --- |
| Chloroacetic Acid | 3,210 parts (34 moles). |
| Sodium Hydroxide, 50% soln. (initial) | 3,900 parts (48.8 moles). |
| Sodium Hydroxide, 50% soln. (final) | 1,088 parts (13.6 moles). |

The product is an amber-colored solution that foams readily and has a pH of 9.1. The conversion to amphoteric surface active agent is about the same as that in Example I.

Example III

Example I is repeated, except for the substitution of the components recorded below for the corresponding components of Example I:

| Component | Amount |
| --- | --- |
| Chloroacetic Acid | 2,835 parts (30 moles). |
| Sodium Hydroxide, 50% soln. (initial) | 3,440 parts (43.0 moles). |
| Sodium Hydroxide, 50% soln. (final) | 960 parts (12.0 moles). |

The product is an amber-colored solution that foams readily and has a pH of 8.4. The conversion to amphoteric surface active agent is about the same as that in Example I.

Example IV

Example I is repeated, except for the substitution of the components recorded below for the corresponding components of Example I:

| Component | Amount |
| --- | --- |
| Chloroacetic Acid | 2,455 parts (26 moles). |
| Sodium Hydroxide, 50% soln. (initial) | 2,980 parts (37.3 moles). |
| Sodium Hydroxide, 50% soln. (final) | 832 parts (10.4 moles). |

The product is an amber-colored solution that foams readily and has a pH of 9.05. The conversion to amphoteric surface active agent was 99%.

Example V

Example I is repeated, except for the substitution of the components recorded below for the corresponding components of Example I:

| Component | Amount |
| --- | --- |
| Chloroacetic Acid | 2,835 parts (30 moles). |
| Sodium Hydroxide, 50% soln. (initial) | 3,440 parts (43.0 moles). |
| Sodium Hydroxide, 50% soln. (final) | 960 parts (12.0 moles). |
| Water | 12,300 parts. |
| Cracked Ice | 7,000 parts. |

The product is an amber-colored solution that foams readily and has a pH of 9.3. The conversion to amphoteric surface active agent was 91.3%.

Example VI

Example I is repeated, except for the substitution of the components below for the corresponding components of Example I:

| Component | Amount |
| --- | --- |
| Fatty amine condensate | 102.6 parts (.383 mole). |
| Chloroacetic Acid | 42.4 parts (.448 mole). |
| Sodium Hydroxide, 50% soln. (initial) | 51.7 parts (.645 mole). |
| Sodium Hydroxide, 50% soln. (final) | 14.3 parts (.179 mole). |
| Water | 200 parts. |
| Ice | 200 parts. |

The conversion to amphoteric surface active agent was about 77.2%.

Example VII

Example I is repeated, except for the substitution of the components below for the corresponding components of Example I:

| Component | Amount |
| --- | --- |
| Fatty amine condensate | 103.1 parts (.385 mole). |
| Chloroacetic Acid | 49.5 parts (.523 mole). |
| Sodium Hydroxide, 50% soln. (initial) | 60.5 parts (.754 mole). |
| Sodium Hydroxide, 50% soln. (final) | 16.7 parts (.209 mole). |
| Water | 200 parts. |
| Ice | 200 parts. |

The conversion to amphoteric surface active agent was about 93.6%.

Example VIII

In a 3-liter 3-necked flask fitted with a stirrer, thermometer and dropping funnel, there is charged 1050 parts of water, 1050 parts of cracked ice and 151 parts (1.6 moles) of chloroacetic acid. 184 parts (2.30 moles) of 50% sodium hydroxide solution is added over several minutes with vigorous stirring. The temperature is maintained at 5–10° C. To this mixture, there is added 352 parts (1 mole) of the molten fatty amine condensate derived from the reaction of stearic acid with 2-hydroxyethyl ethylenediamine. The mixture is then heated with vigorous stirring to 70° C. over 45 minutes, and maintained at this temperature for 30 minutes. The temperature is then raised to 90° C. over 2 hours, and 51 parts (0.64 mole) of 50% sodium hydroxide is added in 1 portion. The temperature is maintained at about 90° C. for 4 hours.

The product [a solution of N-stearoyl-N'-sodium carboxymethyl-N'-(2-hydroxyethyl) ethylenediamine] is a white solid at room temperature, but forms a clear, amber-colored foaming solution on warming to about 80° C.

The conversion to amphoteric surface active agent is about the same as that in Example I.

Example IX

Chloroacetic acid [27.1 parts (0.284 mole)] is dissolved in 200 parts of water in a beaker, and 200 parts of cracked ice is added. The mixture is stirred, and 32.7 parts (0.409 mole) of 50% sodium hydroxide solution is slowly added. The chilled strongly basic solution is placed in a 2-liter 3-necked flask equipped with stirrer, thermometer and condenser. 63.6 parts (0.182 mole) of a fatty amine condensate derived from oleic acid and 2-hydroxyethyl ethylenediamine is added in one portion. The mixture is heated with stirring to 70° C. over 30 minutes and maintained at 70° C. for another 30 minutes. The mixture, which becomes a white gelatinous mass during this period, is heated to 90–95° C. over a 2-hour period, and 9.1 parts (0.114 mole) of 50% sodium hydroxide is added in one portion. The mixture is stirred at about 90° C. for an additional 4 hours and now abandoned.

The product [a solution of N-oleoyl-N'-sodium carboxymethyl-N'-(2-hydroxyethyl) ethylenediamine] is a hazy, amber-colored solution at room temperature.

The conversion to amphoteric surface active agent is about the same as that in Example I.

From the above examples it will be apparent that where the excess of chloroacetic acid over the weight of the amine is less than about 30%, or where the water present is substantially less than 4 times the weight of the amine, there is a material decrease in the yield of amphoteric product.

It was previously believed (see Schwartz and Perry, Surface Active Agents, pages 218, 219) that the use of an excess of chloroacetic acid over a mole to mole ratio in the alkylation of an amine such as

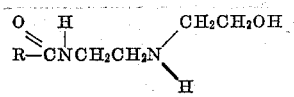

would result in by-products corresponding to the maximum possible substitutions of the carboxymethyl group. In other words, for a primary amine there would be 3 such groups attached to the nitrogen atom and for a secondary amine there would be 2 such carboxymethyl groups. I have discovered that with aliphatic amino compounds within the scope of the general formula set forth above that this is not the case, and that by the use of about 30% excess of chloroacetic over the mole to mole ratio of the chloroacetic to the amine there is nearly a quantitative yield of the desired tertiary amino amphoteric product when the water present is at least 4 times the weight of the amine.

Although Examples I–IX are limited to a process of securing high yields of a N-lauroyl-N'-carboxymethyl-N'-(2-hydroxyethyl) ethylenediamine, a N-stearoyl-N'-carboxymethyl-N'-(2-hydroxyethyl) ethylenediamine, and a N-oleoyl-N'-carboxymethyl-N'-(2-hydroxyethyl) ethylenediamine, similar results are obtained when N-caproyl-N'-(2-hydroxyethyl) ethylenediamine is treated similarly to secure a high yield of N-caproyl-N'-carboxymethyl-N'-(2-hydroxyethyl) ethylenediamine, or when N-myristoyl-N'-(2-hydroxyethyl) ethylenediamine is treated in a similar way to secure a high yield of N-myristoyl-N'-carboxymethyl-N'-(2-hydroxyethyl) ethylenediamine.

Similar results are obtained by this process using other aliphatic amino compounds within the scope of the general formula set forth above.

The products prepared by the processes disclosed herein are particularly useful as shampoos, or when formulated into other types of shampoos by combination with other surfactants, foam boosters, and conditioning agents, e.g., as set forth in the copending application of J. N. Masci and N. A. Poirier, Serial Number 639,185, filed February 11, 1957.

A specific example of a suitable shampoo embodying the products of the process of this invention is as follows:

Example X

One hundred and thirty-two and two-tenths parts of an aqueous solution containing 0.136 mole of N-lauroyl-N'-carboxymethyl-N'-(2-hydroxyethyl) ethylenediamine and 232.5 parts of an aqueous solution containing 0.136 mole of nonylphenoxytriethyleneoxyethyl sulfate sodium salt were mixed and stirred on the steam bath for 30 minutes in an open vessel. Water was added as needed to reduce viscosity. The final weight of product was 622 parts, having 18.7% content of organic surface active materials. The molar ratio of unmodified ampholyte to modifier is 1:1. Fifty-eight and eighty-three hundredths parts of the above solution was mixed with 14 parts of the reaction product of sorbitan monolaurate and 20 moles of ethylene oxide. The solution was neutralized to pH 7 with hydrochloric acid.

The resulting shampoo is mild to the skin and gives copious foam and strong cleansing action when used with hard or distilled water.

It will therefore be apparent that I have developed a simple process for the production of amphoteric surface active agents in consistently high yields, such as 90% or higher.

This application is a continuation of my application Serial Number 717,313, filed February 25, 1958.

It is apparent that many widely different embodiments of this invention may be made without departing from the spirit and scope thereof; and therefore, it is not intended to be limited except as indicated in the appended claims.

I claim:

1. The process of making an amphoteric surface active agent, which comprises rapidly adding a molten fatty amine condensate, derived from the reaction of a $C_{10}$ to $C_{18}$ carbon atom fatty acid with an hydroxyalkyl substituted alkylene diamine, in which the hydroxyalkyl is an alkylol radical of 2–4 carbon atoms and the alkylene radical contains 2–4 carbon atoms, until between 1.5 and 2 moles of water for each mole of fatty acid are volatilized off, to a dilute aqueous solution of sodium chloroacetate that has been derived from the neutralization of one mole of chloroacetic acid with at least 1.3 moles of sodium hydroxide, the sodium chloroacetate being present in at least a 30% molar excess over the fatty amine condensate, in the presence of water equal to at least 3 times the weight of the amine, while keeping the temperature at from 0–15° C., then gradually heating to about 95° C., adding at least 0.4 mole of sodium hydroxide per mole of sodium chloroacetate and heating at about 95° C. for 1–5 hours.

2. The process of claim 1, in which the surface active agent is N-lauroyl-N'-sodium carboxymethyl-N'-(2-hydroxyethyl) ethylenediamine:

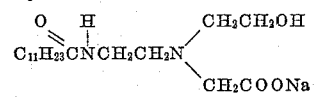

3. The process of claim 1, in which the surface active agent is N-caproyl-N'-sodium carboxymethyl-N'-(2-hydroxyethyl) ethylenediamine:

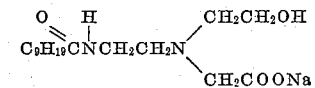

4. The process of claim 1, in which the surface active agent is N-myristoyl-N'-sodium carboxymethyl-N'-(2-hydroxyethyl) ethylenediamine:

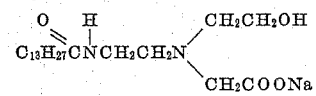

5. The process of claim 1, in which the surface active agent is N-stearoyl-N'-sodium carboxymethyl-N'-(2-hydroxyethyl) ethylenediamine:

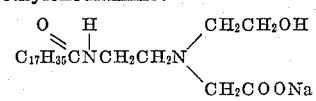

6. The process of claim 1, in which the surface active agent is N-oleoyl-N'-sodium carboxymethyl-N'-(2-hydroxyethyl) ethylenediamine:

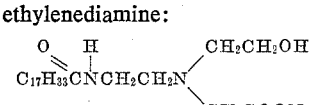

7. The process of claim 1, in which the aqueous solution of chloroacetic acid is cooled to at least 5° C. before neutralization with the sodium hydroxide, the neutralization is carried out at about 10° C., and the mixture of the fatty amine condensate and the neutralized chloroacetic acid is first slowly heated to about 70° C., and then held there for about 30 minutes before heating to about 95° C. over about a 2-hour period, and then adding the additional sodium hydroxide.

8. The process of claim 1, in which the amount of water present is 4–8 times the weight of the amine.

9. The process of claim 2, in which the amount of water present is 4–8 times the weight of the amine.

10. The process of making an amphoteric surface active agent, which comprises rapidly adding a molten fatty amine condensate, derived from the reaction of a $C_{10}$ to $C_{18}$ carbon atom fatty acid with an hydroxylalkyl substituted alkylene diamine, in which the hydroxyalkyl is an alkylol radical of 2–4 carbon atoms and the alkylene radical contains 2–4 carbon atoms, until between 1.5 and 2 moles of water for each mole of fatty acid are volatilized off, to a dilute aqueous solution of sodium chloroacetate that has been derived from the neutralization of chloroacetic acid with an excess of sodium hydroxide, the sodium chloroacetate being present in at least a 30% molar excess over the fatty amine condensate, in the presence of water equal to at least 3 times the weight of the amine, while keeping the temperature at from 0–15° C., then gradually heating to about 95° C., adding sodium hydroxide and heating at about 95° C. for 1–5 hours.

References Cited in the file of this patent

UNITED STATES PATENTS

| | | |
|---|---|---|
| 2,103,872 | Schoeller et al. | Dec. 28, 1937 |
| 2,781,376 | Mannheimer | Feb. 12, 1957 |

UNITED STATES PATENT OFFICE
CERTIFICATE OF CORRECTION

Patent No. 2,970,160                                January 31, 1961

Ruth A. Walker

It is hereby certified that error appears in the above numbered patent requiring correction and that the said Letters Patent should read as corrected below.

Column 4, lines 73 and 74, strike out "and now abandoned" and insert the same after "February 25, 1958" in line 8, column 6.

Signed and sealed this 17th day of October 1961.

(SEAL)
Attest:

ERNEST W. SWIDER                              DAVID L. LADD
Attesting Officer                                     Commissioner of Patents

USCOMM-DC